United States Patent
Konolige et al.

(10) Patent No.: US 10,417,781 B1
(45) Date of Patent: Sep. 17, 2019

(54) AUTOMATED DATA CAPTURE

(71) Applicant: X Development LLC, Mountain View, CA (US)

(72) Inventors: Kurt Konolige, Menlo Park, CA (US); Nareshkumar Rajkumar, Cupertino, CA (US); Stefan Hinterstoisser, Munich (DE); Paul Wohlhart, Sunnyvale, CA (US)

(73) Assignee: X Development LLC, Mountain View, CA (US)

( * ) Notice: Subject to any disclaimer, the term of this patent is extended or adjusted under 35 U.S.C. 154(b) by 148 days.

(21) Appl. No.: 15/396,105

(22) Filed: Dec. 30, 2016

(51) Int. Cl.
| | |
|---|---|
| *G06K 9/46* | (2006.01) |
| *G06T 7/73* | (2017.01) |
| *G06T 7/60* | (2017.01) |
| *G06K 9/62* | (2006.01) |
| *G06K 9/66* | (2006.01) |
| *G06K 9/52* | (2006.01) |
| *G06N 3/08* | (2006.01) |
| *G06F 16/583* | (2019.01) |

(52) U.S. Cl.
CPC ............ *G06T 7/73* (2017.01); *G06F 16/5854* (2019.01); *G06K 9/4671* (2013.01); *G06K 9/52* (2013.01); *G06K 9/6256* (2013.01); *G06K 9/66* (2013.01); *G06N 3/08* (2013.01); *G06T 7/60* (2013.01); *G06T 2200/04* (2013.01); *G06T 2207/30244* (2013.01); *G06T 2219/004* (2013.01)

(58) Field of Classification Search
None
See application file for complete search history.

(56) References Cited

U.S. PATENT DOCUMENTS

| | | | |
|---|---|---|---|
| 2007/0070069 A1* | 3/2007 | Samarasekera | G06F 3/011 345/427 |
| 2011/0107270 A1* | 5/2011 | Wang | G06F 19/3481 715/850 |
| 2012/0076361 A1* | 3/2012 | Fujiyoshi | G01S 17/89 382/103 |
| 2012/0147152 A1* | 6/2012 | Vogiatis | H04N 13/221 348/50 |

(Continued)

OTHER PUBLICATIONS

Maturana ("VoxNet: A 3D Convolutional Neural Network for Real-Time Object Recognition", IROS 2015) (Year: 2015).*

(Continued)

*Primary Examiner* — Mark Roz
(74) *Attorney, Agent, or Firm* — Fish & Richardson P.C.

(57) ABSTRACT

Methods for annotating objects within image frames are disclosed. Information is obtained that represents a camera pose relative to a scene. The camera pose includes a position and a location of the camera relative to the scene. Data is obtained that represents multiple images, including a first image and a plurality of other images, being captured from different angles by the camera relative to the scene. A 3D pose of the object of interest is identified with respect to the camera pose in at least the first image. A 3D bounding region for the object of interest in the first image is defined, which indicates a volume that includes the object of interest. A location and orientation of the object of interest is determined in the other images based on the defined 3D bounding region of the object of interest and the camera pose in the other images.

18 Claims, 7 Drawing Sheets

(56) References Cited

U.S. PATENT DOCUMENTS

2018/0137644 A1* 5/2018 Rad .......................... G06T 7/73

OTHER PUBLICATIONS

Hinterstoisser et al., "Multimodal Templates for Real-time Detection of Texture-less Objects in Heavily Cluttered Scenes," (2011) [online] (retrieved from http://campar.in.tum.de/pub/hinterstoisser2011linemod/hinterstoisser2011linemod.pdf), 8 pages.
Hinterstoisser et al., "Going Further with Point Pair Features," (2016) [online] (retrieved from https://cvarlab.icg.tugraz.at/pubs/hinterstoisser_eccv16.pdf), 15 pages.

* cited by examiner

AUTOMATED DATA CAPTURE

BACKGROUND

This specification relates to automated data capture, including automated or semi-automated annotation of objects within image frames.

Neural networks are machine learning models that employ one or more layers of artificial neurons to generate an output, e.g., one or more classifications, for a received input. Each layer of the network generates an output from a received input in accordance with current values of a respective set of parameters for the layer. Neural networks often require large amounts of annotated training data in order to perform object detection and other tasks.

SUMMARY

This specification relates to technologies for data capture and annotation of image frames. The annotated images can be used to train machine learning models, such as neural networks, to perform computer vision tasks.

In some implementations, a data capture system automatically or semi-automatically annotates a sequence of images to indicate the locations and orientations of objects shown in the images. For example, using a known location and orientation of an object in one image of a scene, the system can propagate information about the object to other images of the scene that were acquired from different perspectives. Once an object has been identified in a single image in a sequence, the system may determine the respective locations and orientations of the object in the remainder of the images in the sequence. By propagating information in this manner, the amount of manual effort needed to annotate large sets of images can be greatly reduced.

In some implementations, the data capture system generates a three-dimensional (3D) representation of a scene and uses the 3D representation to increase the accuracy of annotations. For example, in addition to capturing two-dimensional (2D) images of a scene, the data capture system can obtain depth information indicating distances of objects from the camera, as well as camera position data indicating positions of the camera when images were acquired. When available, 3D computer models of objects can also be registered to the captured image data. With this additional information about a scene, the data capture system can generate a 3D representation of the scene and register images to the 3D representation. A system using this technique may propagate information among images much more accurately than systems that apply annotations based on 2D images alone.

Some systems that have attempted to propagate information solely based on 2D images have been prone to drift or errors that compound from one image to the next. In these systems, the error between annotated locations and actual locations of objects often increases over a sequence of images as labels are propagated from one frame to the next, requiring the users to manually re-draw or correct annotations after a certain number of frames.

In some implementations, the techniques discussed below can use a 3D representation to maintain a high accuracy of annotations across an entire sequence of images. For example, rather than propagate a 2D region from one image frame to the next, the data capture system can determine a 3D volume that represents an object in a scene, and determine the position of the 3D volume for each of multiple image frames. The data capture system then projects the 3D volume onto each of the 2D image frames, which provides better accuracy than estimates based on the differences between 2D images alone.

In some implementations, the data capture system can also account for changes in the apparent shape or size of an object due to changes in perspective or due to occlusion by other objects. For example, odometry information can indicate the position of a camera when images are acquired. By tracking camera positions and/or registering images to a 3D representation, the orientation or 3D pose of objects can be automatically determined and stored in annotations in each image frame. Additionally, registering camera positions with respect to a 3D representation of the scene, can allow the data capture system to determine which regions of an object are visible from a different view and to designate the size and location of the object accordingly. Similarly, the system can use depth information, e.g., determined using a stereo camera, lidar, radar, or other sensor, to determine when an object is partially or fully occluded by another object. Through various techniques discussed below, the data capture system can determine the degree to which an object is occluded and annotate the image with this information, in addition to the location and orientation.

In general, one aspect of the subject matter described in this specification can be embodied in a system comprising one or more computers and one or more storage devices storing instructions that are operable, when executed by the one or more computers to cause the one or more computers to perform operations that implement an example method. An example method comprises: obtaining information representing a pose of a camera relative to a scene, the pose of the camera including a position and a location of the camera relative to the scene; obtaining data representing multiple images of a scene that includes an object of interest, the multiple images being captured from different angles by the camera relative to the scene, the multiple images including a first image and a plurality of other images; identifying a 3D pose of the object of interest with respect to the pose of the camera in at least the first image; defining a 3D bounding region for the object of interest in the first image, the 3D bounding region indicating a volume that includes the object of interest; and determining a location and orientation of the object of interest in the other images based on the defined 3D bounding region of the object of interest and the pose of the camera in the other images.

These and other embodiments can optionally include one or more of the following features. Each of the other images can be annotated to indicated (i) a location in the image where the object of interest appears and (ii) an orientation that the object appears in the image and the annotated images can be stored. Machine learning models can be trained using the annotated images. Training the machine learning model can comprise training a neural network to recognize objects in image data using the annotated images. A LINEMOD method can be used to identify a 3D pose of the object of interest with respect to the pose of the camera in at least the first image. An EPPF method can be used to identify a 3D pose of the object of interest with respect to the pose of the camera in at least the first image. Identifying a 3D pose of the object of interest with respect to the pose of the camera in at least the first image may comprise having a user manually annotate the image by drawing a 3D bounding box around the object in the first image. Determining the location and orientation of the object of interest in the other images may include applying a camera pose estimation algorithm to the other images. The camera pose estimation algorithm may be a structure from motion algorithm. The camera pose estimation algorithm may be a visual odometry algorithm. The camera pose estimation algorithm may be a SLAM algorithm. The example method may further comprise: determining, for a particular image of the multiple images, an occlusion score for the object of interest that indicates an amount of the object of interest that is occluded in the particular image; and storing data that associates the occlusion score for the object of interest with a particular image. The example method may further comprise: obtaining a three-dimensional representation of the scene; determining a camera position that was used to acquire the particular image; and determining, based on the camera position and the three-dimensional representation of the scene, that a second object occludes a portion of the object of interest from the perspective of the determined camera position but does not fully occlude the object of interest, wherein determining the occlusion score comprises determining the occlusion score based on an amount of the object of interest that is occluded by the second object. A neural network can be trained using the particular image and the occlusion score.

The subject matter described in this specification can be implemented in particular embodiments so as to realize one or more of the following advantages. For example, once an object has been annotated in a single image of a scene, other images of the scene can be automatically annotated to indicate the object. The annotations that are made can indicate both the location and orientation of the object. In addition, the accuracy of annotations can be increased relative to prior approaches. For example, a system can avoid introducing errors into annotations propagated from one image to another using depth information together with image data, or by generating annotations based on 3D volumes representing an object. Further, in some implementations, the system can determine whether a view of an object has been occluded in an image frame. Annotations can indicate whether an object has been occluded, and may indicate a portion or amount of the object that has been occluded.

The techniques disclosed herein can generate a more robust and accurate set of training data for training machine learning models such as neural networks. In conventional data capture systems, the process of gathering and annotating training data is time-consuming and labor-intensive. To train neural networks accurately, high-quality training data is generally needed. All objects shown in an image should be identified and annotated prior to training a neural network with the image. To a neural network, the absence of an annotation signals that the object is not present. Thus, if an object is shown in an image but is not annotated, and the neural network is trained with the image, the network may learn to not recognize the object. The data capture system discussed herein can fully annotate all relevant objects in an image frame, and propagates annotations to each of the other image frames of the same scene. For example, the system can perform partial pose annotation of images and 3D mapping of the environment. The annotation system provides this annotated data to a neural network to properly train the neural network to detect objects and, in some implementations, assist a robot to manipulate objects shown in image frames.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes an example automated annotation system that automatically propagates annotations of objects from one image frame to other image frames of a sequence or video. The example automated annotation system provides these images with annotated objects to neural networks as training data for machine learning models. For example, the annotated images can be used to train the neural networks for a perception task, e.g., a computer vision task.

In some implementations, neural networks or other perception models can be trained to interact with physical environments. For example, neural networks can be used by machines, such as robots, to recognize and manipulate objects in a physical environment.

A training system can train the neural network using a machine learning training algorithm. For example, training may involve computing a gradient of an objective function with respect to parameters of the neural network. The training process adjusts values of parameters of the neural network, e.g., to determine trained values of the parameters that differ from the initial values of the parameters. Training neural networks is often a time-consuming and laborious process because neural networks require a great deal of training data in order to be trained properly.

To provide a neural network with appropriate training data, an annotation system may identify and annotate all relevant objects in images. For example, if a neural network should learn to recognize a particular object of interest, such as a cup, an annotation system should annotate every instance of a cup in each image used to train the neural network. If images used for training are only partially annotated, and thus fail to indicate the presence of objects the network should learn to detect, then the missing or incomplete information may result in poorly trained networks that do not always correctly identify objects. The example automated annotation system discussed below allows images in a sequence to be completely annotated, e.g., with annotations indicating each relevant object in each image in a sequence. Further, the system may generate annotations that indicate the orientation or 3D pose of objects, in addition to the location of the objects in the image. As discussed below, the system may use various techniques including partial pose annotation of images and 3D mapping of the environment.

Figure 1:
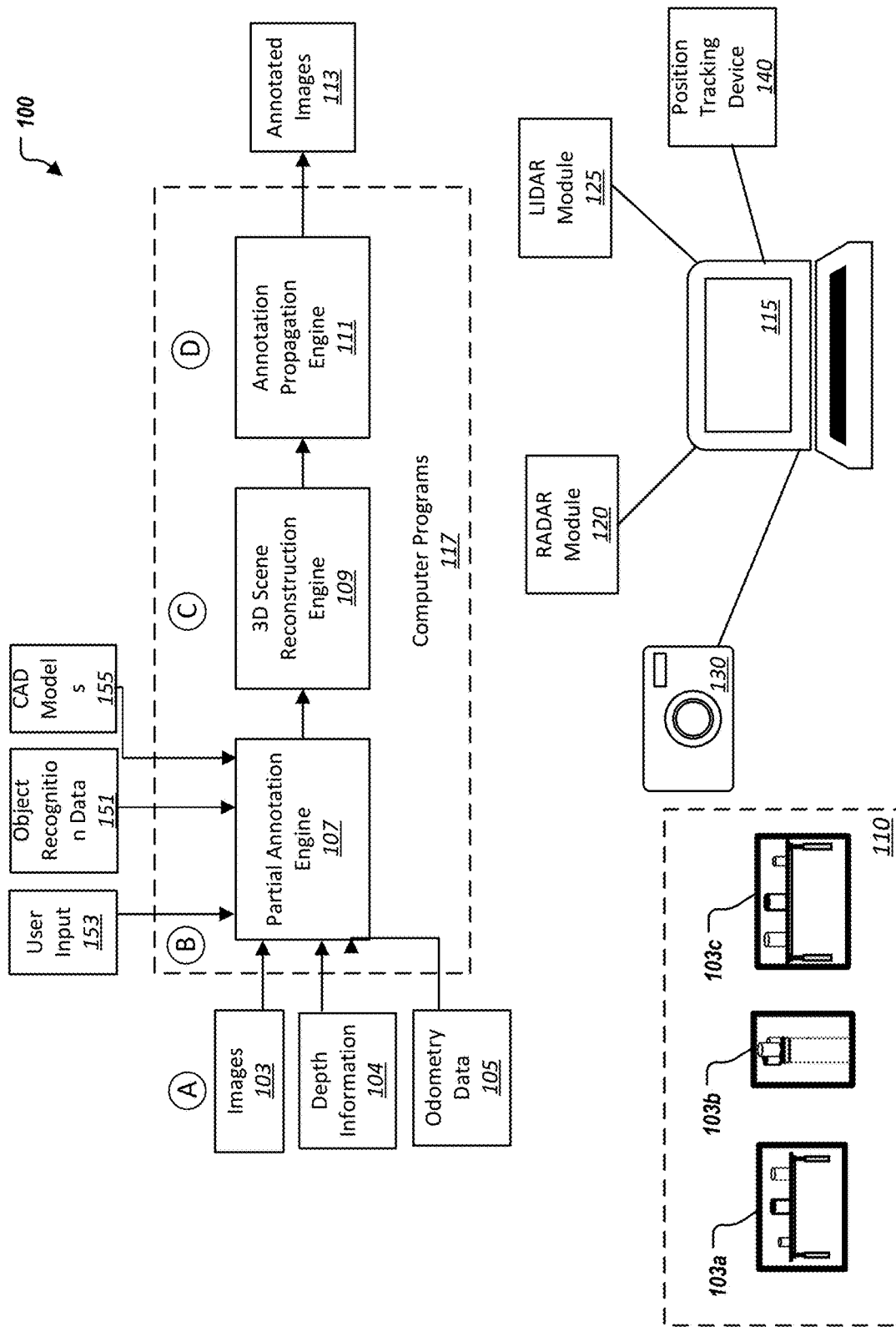
FIG. 1 illustrates an example automated annotation system.

FIG. 1 illustrates an example automated annotation system 100. The automated annotation system 100 includes one or more computers 115 in one or more locations. The one or more computers 115 can run various computer programs 117 to carry out the functions discussed below. In general, the systems, components, and techniques described below can be implemented in hardware, software, or a combination of both. The figure indicates stages (A) through (D) which represent a flow of data, and which may occur in the order illustrated or in another order.

The example of FIG. 1 shows various operations that are performed by the annotation system 100 to capture a sequence of images of a scene and generate annotations that indicate the location and orientation of an object in each image. Briefly, the system 100 obtains images of a scene from different viewpoints, and may also acquire other information about the scene. The system 100 then identifies the location and orientation of one or more objects in one of the images. The system 100 determines the position of identified objects in a 3D representation of the scene. For example, each object identified can have a 3D volume associated with it. The system 100 then annotates the remainder of the images of the scene to indicate the location and orientation of the identified objects. For example, the system can register the camera position used to acquire a particular image with the 3D representation of the scene. The system 100 then uses the 3D volume representing an object to determine the apparent size, shape, and location that the object appears in the particular image. The system 100 also determines the orientation of the object as shown in the particular image.

In stage (A), the system 100 acquires a set of images 103 of a scene. For example, a camera 130 can acquire a sequence of still image frames or video frames from different positions relative to the scene. For example, the images can show aspects of the scene from different viewpoints or angles. In some implementations, the set of images 103 includes views from substantially a 360-degree range, spaced apart by positions of roughly 10 to 50 degrees. The images 103 are generally 2D images representing actual objects in a physical environment.

In the example of FIG. 1, examples of images 103 are shown as images 103a-103c. Each image 103a-103c contains an object of interest, e.g., a cup, a person, or some other object that is in the particular image scene. The sequence of images 103a-103c of FIG. 1 shows three cups on a table, with each image in the sequence showing the cups from different angles. The images 103a-103c are shown more clearly in FIG. 2.

In some implementations, depth information 104 is acquired with the images 103. The depth information 104 can indicate positions of objects from the camera 130 for each image. For example, when each image 103 can be captured using a stereo camera that allows distances of objects from the camera to be determined. For example, a RGB-D (red, green, blue, and depth) sensing camera can be used. As another example, a LIDAR module 125, a radar module 130, or another sensor could be used to determine depth information corresponding to an image 103. The depth information 104 can indicate, for some or all of the images 103, a depth map indicating relative positions of objects shown in the image acquired by the camera 130.

In some implementations, odometry data 105 is acquired with the images 103. The odometry data 105 can indicate the position, e.g., location and orientation, of the camera 130 when each image 103 is acquired. When the camera 103 is moved by a machine, a position tracking device 140 can track the movement of the camera 130. For example, sensors in a robotic arm or a wheel of a robot can track movement as a robot moves the camera 130 to different positions for acquiring images 103. In some implementations, the odometry data 105 indicates absolute positions in a frame of reference. In other implementations, the odometry data 105 may simply indicate relative positions, e.g., indicating that one image was taken at certain angular offsets and/or translational offsets relative to another image of the scene. As another example, odometry data 105 can be generated using a visual tracking system. For example, one or more motion capture markers can be placed on the camera 130, and a tracking device can track the motion capture markers to determine the position of the camera 130 at each position where an image 103 is acquired. In some implementations, accelerometers or other sensors can be used to estimate changes in the location or orientation of a camera 130, e.g., as a user walks around a scene to capture images from different positions.

In stage (B), the system 100 identifies a location and orientation of an object of interest in at least one of the images 103. Any of various techniques can be used to identify an object and determine its location, size, and shape. For example, the image may be provided to an object recognition system, e.g., to a server system over a network. In response, the system 100 can receive object recognition data 151 that indicates one or more objects present in the image, as well as the location of the object(s) in the image. For example, the location of an object may be specified using a 2D bounding box, a polygon or other shape, an outline of the object, or in another manner. Specifying the location of an object may be done manually or automatically.

As another example, the system 100 may provide a user interface that allows a user to identify objects in an image. The user may interact with the image to provide user input 153 that specifies a location of an object, e.g., by tapping or otherwise indicating a location of the object, by drawing a 2D bounding box or other shape around the object, and so on. The user input 153 can also indicate the size and/or shape of the object. In some implementations, the object is located on a substantially planar surface, such as a floor or table, and the user can indicate points on the surface as it appears in the 2D image 103. The system 100 may use the indicated points define a 3D volume corresponding to the object, as discussed further below with respect to FIG. 3.

In some implementations, the system 100 receives information about an object or type of object shown in the image. For example, the system 100 can receive one or more 3D computer-aided design (CAD) models 155. The models 155 may represent objects that are known to be present in the scene, or may represent a set of objects that are not necessarily in the scene. The system 100 can generate different views of the objects represented by the CAD models 155, and compare the different views to an image. The system 100 then identifies objects in areas of an image that match the characteristics of one of the views of the CAD models 155. Other techniques for comparing a CAD model 155 with an image 103 may additionally or alternatively be used.

The system 100 also determines an orientation or pose of the identified objects. The determined orientation can be a 3D pose, which is both a 3D translation and a 3D rotation of the object. For example, an orientation of the 3D object is shown in the 2D image 103. The 3D pose can indicate one or more degrees of freedom, such as one or more rotational degrees of freedom about orthogonal axes. An object can have orientation references defined, e.g., a front and back side can be specified, or one or more axes can be defined through the object, or certain points on the object can be set. The 3D pose information may indicate one or more rotational offsets between the references on the object relative to a coordinate system or a viewpoint of the camera when the image was acquired. As an example, an image may show an object on a planar surface, and a reference on the object may be defined. The 3D pose information for an image may indicate a rotation of the object as seen in the image. For example, the 3D pose may indicate that the image shows a view with the object at a 20-degree offset from a 0-degree reference position.

In some implementations, 3D pose information is provided through user input 153 to a user interface provided by the system 100. In addition, or as an alternative, a 3D pose is generated by registering a 3D CAD model 155 with the view of the object in an image. For example, the partial annotation engine 107 uses any of several methods to detect the object of interest in at least one image of the sequence 110 and identify the object's 3D pose and 3D bounding region. The partial annotation engine 107 can use LINEMOD, extended point pair features (EPPF), or any other algorithm that detects objects of interest in images to generate the 3D pose and bounding region. LINEMOD is a method that uses both depth and color images to capture the appearance and shape of the object of interest in a series of images showing different views of the object. It can be used to match templates, such as CAD models 155, to an image for object detection and estimation of pose. LINEMOD is described in detail in "Multimodal Templates for Real-Time Detection of Texture-less Objects in Heavily Cluttered Scenes," Hinterstoisser et al (2011) (retrieved from http://campar.in.tum.de/pub/hinterstoisser2011linemod/hinterstoisser2011linemod.pdf).

EPPF is a method that matches point pair features from a given model to the given scene. A point pair feature consists of two points and their surface normal, and is a discretized four dimensional vector. EPPF is described in detail in "Going Further with Point Pair Features," Hinerstoisser et al. (2016) (retrieved from https://cvarlab.icg.tugraz.at/pubs/hinterstoisser_eccv16.pdf).

Both of these techniques use a CAD model 155 of the object of interest in order to determine the 3D pose and bounding region of the object of interest.

In some implementations, defining the bounding region of an object of interest also involves depth information from stereo camera data 130, LIDAR 125, or radar 130. For example, when an object is detected in a 2D image, the corresponding portions of a depth map for the image can be identified. The system 100 can identify relatively smooth changes in depth that represent contours of the object and abrupt changes that likely represent edges of the object. The system 100 can also compare the boundaries identified using depth information with boundaries identified by changes in color, intensity, or other parameters of the 2D image to set a bounding region for the object. For example, intensity gradients and/or color gradients can be computed and used along with depth gradients to estimate the edges of an object. Known properties of the object, such as a size or shape indicated by a CAD model, can also be used to determine the size, shape, and orientation of an object as shown in an image.

In some implementations, the location and orientation of an object may be estimated using only 2D image data. For example, a bounding region for an object can be estimated based on color gradients and intensity gradients. Landmark features of an object, such as key points or edges known to occur on the object, can be identified. In these implementations, the system 100 may search through the sequence of images 103 for an image showing a recognizable edge or feature that indicates the 3D pose of the object, and designate the location and orientation of the object for that image.

In stage (C), the system 100 generates a 3D representation of the scene. As discussed above, the system 100 can obtain odometry data 105 that indicates the position of the camera 130 when each of the images 103 was acquired. The system 100 can use this information, along with the depth information 104 and/or images 103, to generate a 3D representation of the scene.

For example, the automated annotation system 100 uses a 3D scene reconstruction engine 109 to create a 3D representation of the scene that includes the object of interest 203. This 3D representation of the scene is created by aligning multiple 2D images 103 and their corresponding depth information. Each of the images 103 can represent a view from a different position relative to the scene, and the odometry data 105 can indicate the differences in the camera positions. The odometry data 105 can thus be used to register the different camera positions in a 3D coordinate system. The depth information 104 can include a depth map showing distances of objects from the camera 130 at some or all regions of captured images 130. Using the known offsets between camera positions, the depth information 104 can be used to specify the shapes and contours of different sides of the objects to create the 3D representation.

The 3D scene reconstruction engine 109 uses the 3D representation of the scene to determine the absolute pose of the object of interest 203 within the scene. For example, the 3D scene reconstruction engine 109 can use multiple images 103 and their depth information 104 to set or refine the 3D pose and 3D bounding region for an object in the scene. For example, if CAD model 155 data is not available for an object, the overall shape of the object may not be known ahead of time. Nevertheless, depth information acquired from different camera positions can be used to determine different surfaces of the object, which can be pieced together to indicate the overall shape or volume of the object. Similarly, the relationship between reference positions on the object and a reference position, e.g., coordinate system, for the 3D representation of the scene can be determined.

In some implementations, the 3D scene reconstruction engine 109 applies estimation techniques such as structure from motion, visual odometry, or simultaneous localization and mapping (SLAM) to the images 103 to generate the 3D representation of the scene or determine the relative pose of the object of interest. Structure from motion is a technique that allows for reconstructing a scene in three dimensions by inferring the geometrical features of the scene from camera motion. Visual odometry is a process of determining the position and orientation of an object by analyzing the associated camera images. For example, when odometry data 105 is not available, the differences in camera positions can be inferred based on the differences in image content. This technique can be enhanced when shapes of at least some objects or surfaces in the scene are known, allowing the system 100 to use transformations to register shapes or landmark features that appear in the image to known features of the objects in the scene. SLAM is a computational approach that involves constructing or updating a map of an unknown environment while also keeping track of the position or location of the object of interest.

In stage (D), the system 100 generates annotations for each of the images 103. These annotations can identify that a certain object or type of object is present in an image, as well as indicate, for example, the location and 3D pose of identified objects. The location may be indicated in the form of a 2D bounding box, an outline, an indication of a center point, a polygon or other shape, and so on. The 3D pose may indicate a position relative to a reference, e.g., one or more angular offsets between a reference on the object and a position of the camera when the image was acquired.

To generate the annotations, information about the object that was determined for one image 103 is propagated to the other frames. For example, the identification of an object in one image 103a can be propagated so that the object is also identified in images 103b and 103c in the sequence 110. In this manner, the annotations of objects in an entire sequence 110 of images can be determined from a single annotated frame in the sequence. The system 100 can use the 3D representation of the scene and a 3D bounding region defined for the object to generate annotations. Since each of the images 103 is acquired using a different camera position, the apparent location, size, and shape of an object may vary from one image to the next. For example, different images 103 may show different regions of an object, or may show the object at different orientations, with the object being shown at different portions of the 2D image frame. Because of these differences, simply shifting 2D bounding region from one image to another can introduce drift and other inaccuracies. Using the 3D representation of the scene and a 3D bounding region can provide greater accuracy, because the 2D bounding region may be determined for each image 103 individually based on understanding of the 3D relationships in the scene, including the 3D shape and 3D pose of an object.

The annotation propagation engine 111 uses the absolute position of an object of interest with respect to the 3D representation of the scene to determine the location and orientation of the object 203 in each of the images 103 that do not have an annotation for the object of interest. The annotation propagation engine 111 can align a particular two-dimensional image with the 3D model of the object and use the alignment to determine the position of the object of interest relative to the camera view. This relative position determines how the 3D bounding region annotation is propagated to the other images 103 in the sequence 110. The propagation of location, orientation, and annotation of an object of interest is done automatically, without user input, from one image to all other images in the sequence.

To annotate each of the images 103, the system 100 determines the position and orientation that the object appears for each of the images. This process can involve determining the camera position corresponding to each of the images 103 in the sequence 110, using the odometry data 104 or by inferring camera positions based on comparisons of the images 103 to view of the 3D representation of the scene.

Once the relative camera positions have been calculated, the annotation propagation engine 111 computes the pose for the object of interest 203 with respect to the camera position for every image 103 of the sequence 110 to be annotated. The system 100 can use the detected 3D pose and 3D bounding region that have previously been determined for one particular image, and can determine the offsets between the camera positions of the other images and that particular image. From the offsets, the annotation propagation engine 111 can determine the apparent size, shape, location, and orientation that the object will have in each image 103. For example, for a given image, the annotation propagation engine 111 can generate a projection of the 3D bounding region onto a 2D view as would be seen from the camera position for that image. Based on this projection, a 2D bounding region is defined around the region of the image 102 that shows the object.

In addition, the offsets between the camera positions can be used to determine orientation or pose information to use in annotating the images 103. Because the camera positions and the position of the object are both registered to the 3D representation of the scene, the relative differences in camera positions for different images can represent differences in apparent orientation of the object. Thus, the annotation information can indicate, for example, that one image shows the object at an offset of 20 degrees from a reference position, while another image shows the object at an offset of 50 degrees and an elevation of 35 degrees, and so on.

The annotations to images 103 can include other information about identified objects or the scene in which they occur. For example, the system 100 may generate scores indicating whether an identified object is occluded, and if so, what portion is occluded or what amount of the object is occluded. This information may be generated based on depth information 104 for an image, e.g., where abrupt changes in depth demonstrate that an object is in front of an object of interest, or that the apparent surface does not match the known shape of the object of interest. As another example, information from the 3D representation of the scene can be used to determine that, from a particular camera position used to acquire an image, one or more objects will occlude portions of another object of interest. The system 100 may determine how much an object is occluded in the current image by comparing the projected CAD model of the object or the 3D bounding box with the depth image. If the depth values from the depth image are much closer, the system 100 counts the object as occluded.

Once the system 100 has determined the 3D pose and bounding region of the images 103, the automated annotation system 100 can store the location, orientation, and other annotation information in metadata for the images 103, in a database, or other data storage. In some implementations, the automated annotation system 100 also stores camera frame information, including the camera position and location of image in which the object of interest's 3D pose and bounding region were identified.

After the images 103 have been annotated, the system 100 or another computing system may use the annotated images to train a machine learning model. For example, the annotated images can be provided as examples of certain types of objects. Because the annotations are propagated among all the images 103 in a sequence 110, all instances of objects of interest are labeled and indicated to the neural network. This allows the neural network to be trained more accurately, since the neural network will not encounter conflicting training examples, such as an object shown in one image being indicated present while the same object is shown in another image and is not indicated to be present. Also, with the 3D pose information in the annotations, the neural network can learn to estimate poses of objects based on 2D images. Additionally, information about occlusion of objects can improve the robustness of the neural network to detect objects that are partially occluded, e.g., allowing recognition of partial views that might not be recognized otherwise. Occlusion information can also help avoid recognition errors that could result from training with partially occluded views, such as errors where different portions of a single object might be erroneously detected as multiple different objects.

Figure 2:
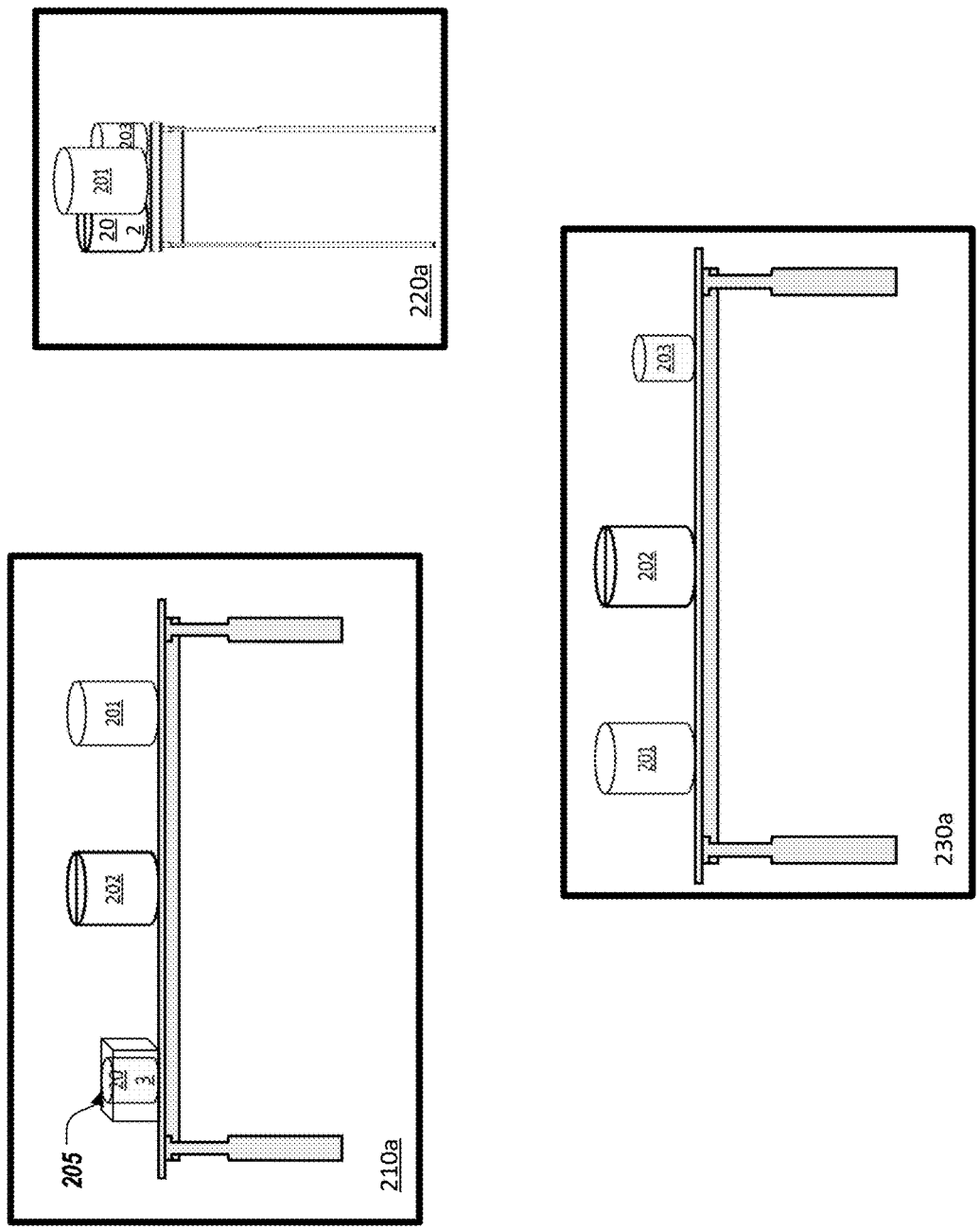
FIG. 2 illustrates the sequence of images that includes an object of interest.

FIG. 2 illustrates the sequence of images 110 that includes an object of interest 203. The partial annotation engine 107 detects the object of interest 203 in image 210a using an algorithm such as LINEMOD or EPPF. Once the object 203 has been detected, the partial annotation engine can identify the object 203's 3D pose and bounding region 205. In some implementations, defining the 3D bounding region includes aligning the two-dimensional image with a 3D model of the object. For example, image 210a can be aligned with a 3D model of the object of interest 203 in order to determine the bounding region for the object 203.

As shown, images 220a and 230a of the sequence 110 illustrated in FIG. 2 also contain object 203. However, the partial annotation engine 107 only needs to identify the pose and the bounding region 205 of object 203 in one image of the sequence 110, since the automated annotation system 100 will propagate annotation information for image 203 to the other images in the sequence 110. This represents a significant reduction in the amount of work that a user is required to perform in order to obtain a sequence of images in which objects are appropriately annotated in the entire sequence 110.

In general, the relative pose information for an object may include the size, location, and orientation of the object of interest 203 in an image. The annotation propagation engine 111 compares the relative poses of the object of interest 203 and the position of the camera in each of the other images, 220a and 230a, with the 3D pose and camera position of the object of interest 203 in the image in which it is annotated, image 210a. The 3D scene reconstruction engine 109 determines the angular offset between the camera position for the image in which the object of interest is annotated, 210a, and the other images in the sequence 220a, 230a. The 3D scene reconstruction engine 109 can use tracked motion of the camera to determine camera position among images in the sequence 110. The absolute camera pose for the object of interest 203 is computed by comparing the angular offset, or tracked motion, of the camera and the relative pose of the object of interest 203 in each image.

Figure 3:
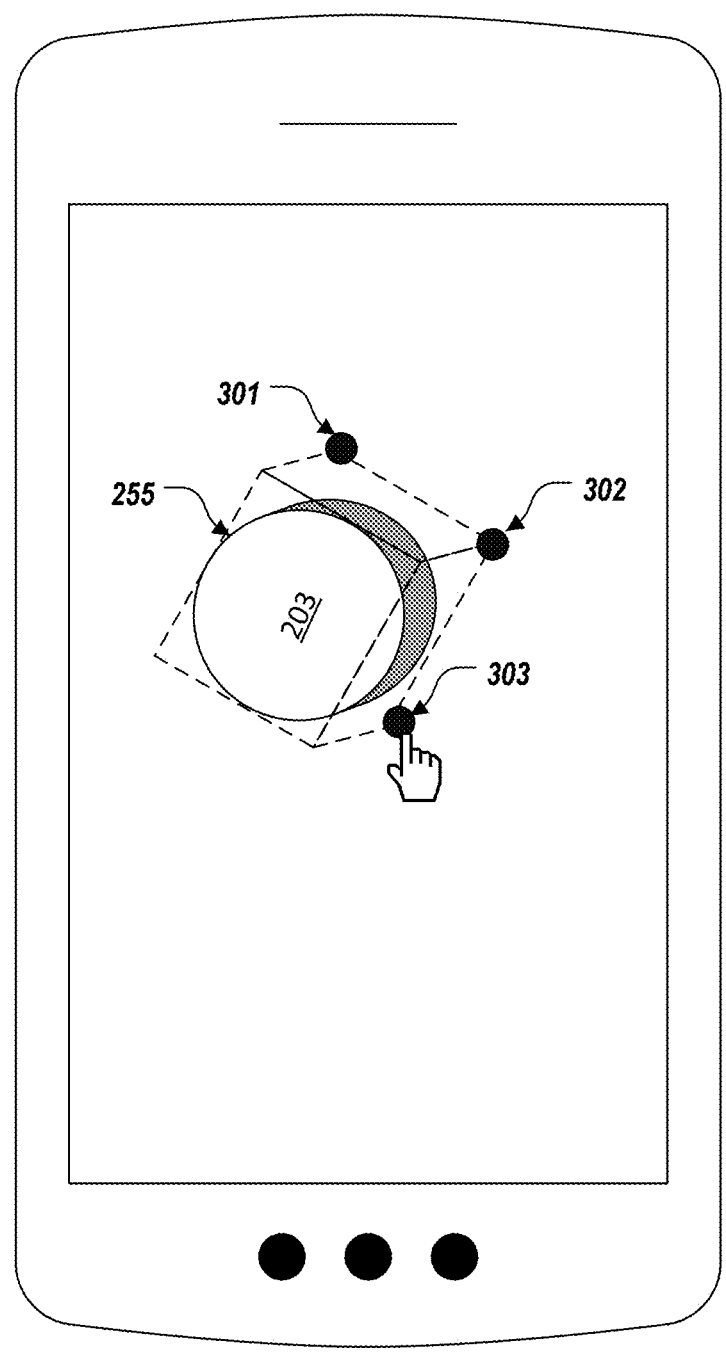
FIG. 3 illustrates an example user interface for allowing the user to manually specify a 3D bounding region of the object of interest.

FIG. 3 illustrates an example user interface for allowing the user to manually specify a 3D bounding region 255 of the object of interest 203. In some implementations, the automated annotation system 100 may not detect the location or pose of the object of interest in any of the received image frames. Detection of the object may be difficult, for example, if the object is transparent, highly reflective, deformable, or articulated. In these circumstances, an automated annotation system 100 allows a user to manually annotate an image sequence by drawing a 3D bounding box around the object in one of the images of the image sequence or video.

In the example shown in FIG. 3, the object of interest 203 is placed on a planar surface. For some situations, the user can indicate that the surface is planar, or the system 100 can assume that the surface is substantially planar to facilitate annotation. To manually define the bounding region 255, the user specifies three points 301-303 on the planar surface that the object is resting on. By connecting the three points 301-303 and interpreting them to represent a right angle, the system 100 can define a rectangle that represents the footprint of the object on the planar surface. The system 100 then defines a 3D volume that extends normal to the planar surface, e.g., above the rectangle defined by the three points 301-303. The height that the 3D volume extends can be determined from various types of information. In some implementations, the system 100 automatically determines the height of the object in the 2D image, for example, based on edges detected in the image or from depth information for the image. A 3D representation of the scene can be used to determine how high above the planar surface to extend the 3D bounding region representing the object. In some implementations, a user specifies the height by indicating one or more other points on the user interface.

Other techniques for determining a 3D bounding region of an object can be used. For example, more or fewer points may be specified on a user interface. As an example, a user may simply indicate a single point or location in an image 103, and the system 100 may use depth information, comparisons with other images 103, and/or a 3D representation of the scene to determine the 3D bounding region for the object at the user-indicated location. As another example, a user may draw a 2D bounding box, a polygon, or other shape around an object in an image 103, and the system 100 may similarly use depth information 104, comparisons with other images 103, and/or a 3D representation of the scene to determine the 3D shape and location of the object.

Figure 4:
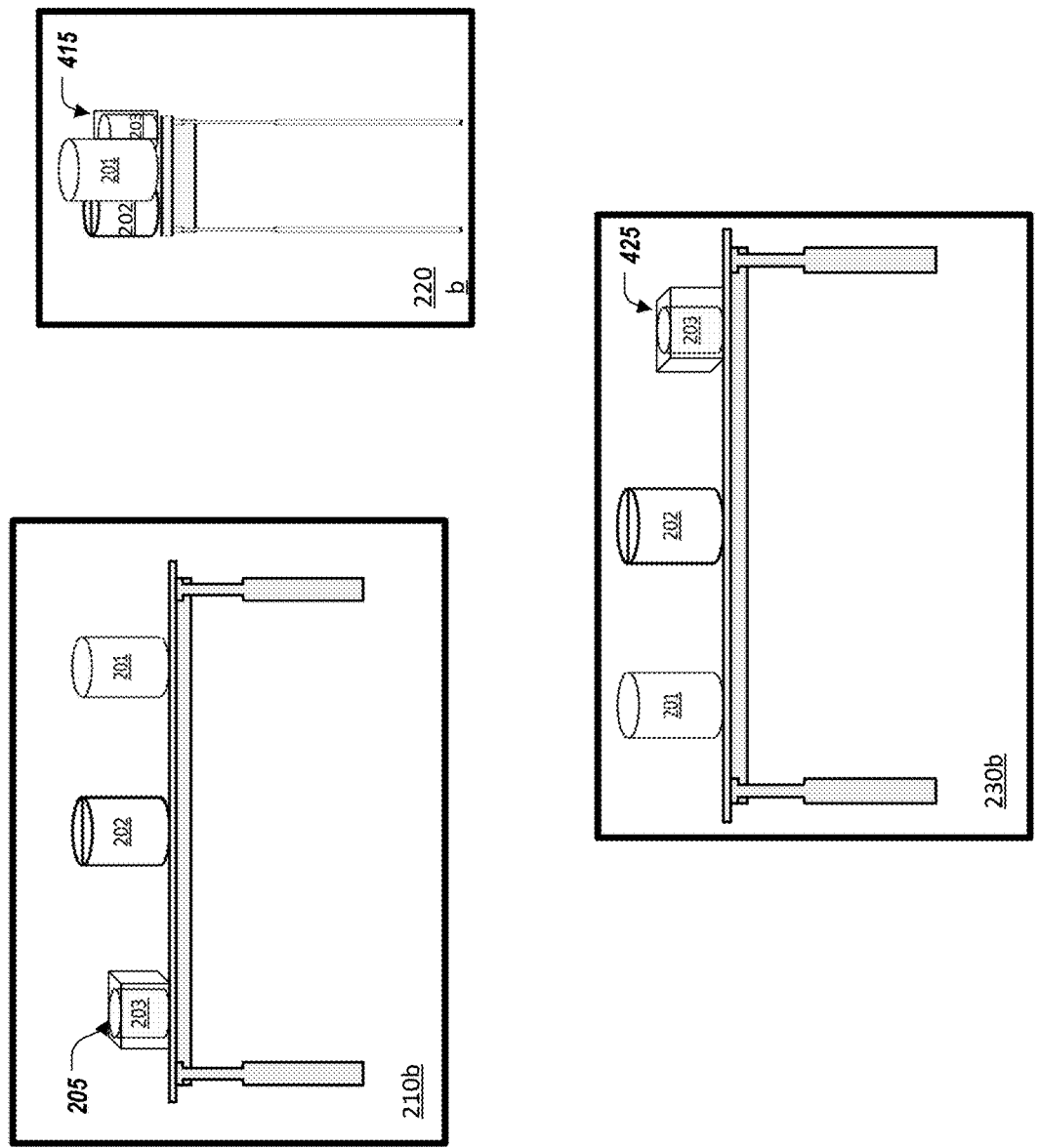
FIG. 4 illustrates the sequence of images of FIG. 2 with propagated annotations.

FIG. 4 illustrates the sequence of images 110 of FIG. 2 with propagated annotations. As illustrated, in FIG. 2, image 210a contains the object of interest 203 with a 3D annotation. Images 220a and 230a of FIG. 2 do not contain the 3D annotation for the object of interest 203. FIG. 4 depicts the propagation of the 3D annotation 205 for the object of interest 203 from image 210b, corresponding to image 210a, to all other images in the image sequence 110. After propagation, image 220b contains the object of interest 203 annotated with the 3D bounding region 415 and image 230b contains the object of interest 203 with the 3D bounding region 425.

As shown in FIG. 4, the object of interest 203 is partially occluded in image 220b. To handle objects of interest that are occluded in images, the automated annotation system 100 renders a depth map of the object of interest 203, e.g., using the depth information 104 captured when the image 220b was captured. Alternatively, depth information can be generated in other ways, such as using comparisons between images captured at different positions, using structure from motion techniques. The system 100 identifies the objects in front of the object of interest 203 as well as their shapes and positions in the 3D representation of the scene.

The system 100 then determines an amount of the object of interest 203 that is visible, and the partial view that is visible in the image 220b. For example, the system 100 may determine a percentage of the object of interest 203 that is visible, and determine a portion of the object of interest 203 that is visible. The automated annotation system 100 may provide occlusion data for each image in the sequence of images 110. For example, for each annotated object in each image 103, the system 100 may assign an occlusion score. As an example, a value of zero may indicate that the object is not occluded, and a value of 100 may indicate that the object is completely occluded, with values in between indicating different levels of partial occlusion. This occlusion detection and scoring is particular advantageous when there are multiple objects in a scene cluttering the vision field. Each image in a sequence of images may show a different portion of the object of interest occluded in a different way. By identifying an occlusion score, the automated annotation system can provide a neural network with the measure of occlusion of each object of interest when training a neural network.

Figure 5:
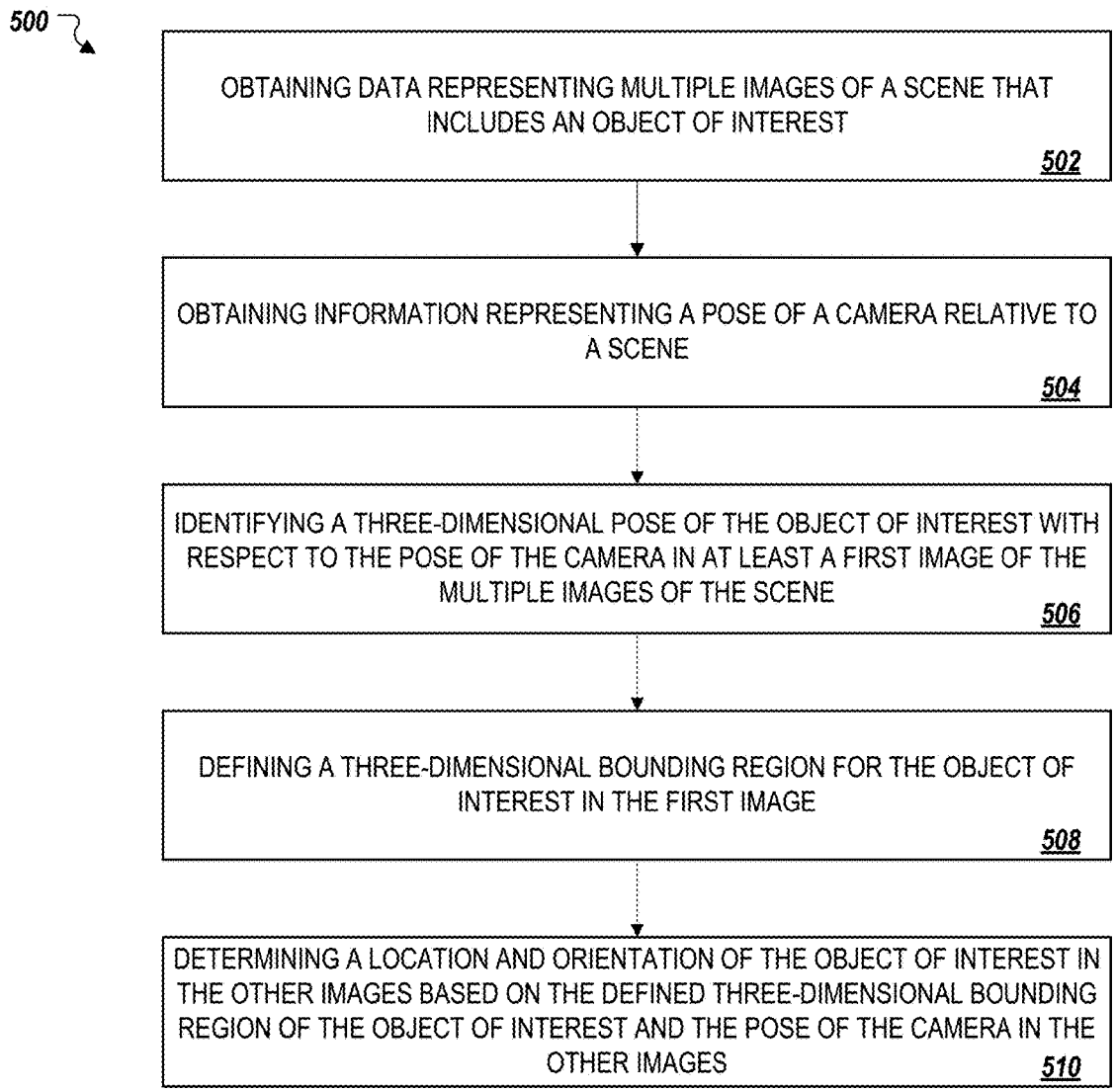
FIG. 5 is a flowchart of an example process for fully annotating objects in an image frame and automatically propagating the object annotations to other image frames.

FIG. 5 is a flowchart of an example process for fully annotating objects in an image frame and automatically propagating the object annotations to other image frames. For convenience, the process 500 will be described as being performed by a system of one or more computers, located in one or more locations, and programmed appropriately in accordance with this specification. For example, an automated annotation system, e.g., the automated annotation system 100 of FIG. 1, appropriately programmed, can perform the process 500.

The automated annotation system obtains data representing multiple images of a scene that includes an object of interest (502). The automated annotation system also obtains information representing a pose of a camera relative to the scene. The pose of the camera includes the position and the location of the camera relative to the scene (504). The automated annotation system then identifies a 3D pose of the object of interest with respect to the pose of the camera in at least a first image of the multiple images of the scene (506). The annotation system uses a method for detecting objects such as LINEMOD or EPPF to detect the object and determine its position.

The automated annotation system defines a 3D bounding region for the object of interest in the first image (508). This bounding region indicates a volume that includes the object of interest. The bounding region can be defined by applying camera pose estimation algorithms to the other images to determine the relative position of the object in the other images compared with the known position of the object in the first image. Camera pose estimation algorithms include a structure from motion algorithm, a visual odometry algorithm, or a SLAM algorithm. A camera post can also be estimated using odometry from other hardware sensors or out-side-in tracking with motion captures markers. The automated annotation system then determines a location and orientation of the object of interest in the other images based on the defined 3D bounding region of the object of interest and the pose of the camera in the other images (510). The 3D bounding region of the object of interest is propagated to the other images in which the object appears using the pose of the object of interest and the camera position in the other images relative to the camera position and 3D pose and bounding region of the object of interest in the first image. The annotation of the object of interest, can be stored in a database or other data store. Additionally or alternatively, the location and orientation of the object of interest in each of the multiple images can be stored.

Figure 6A:
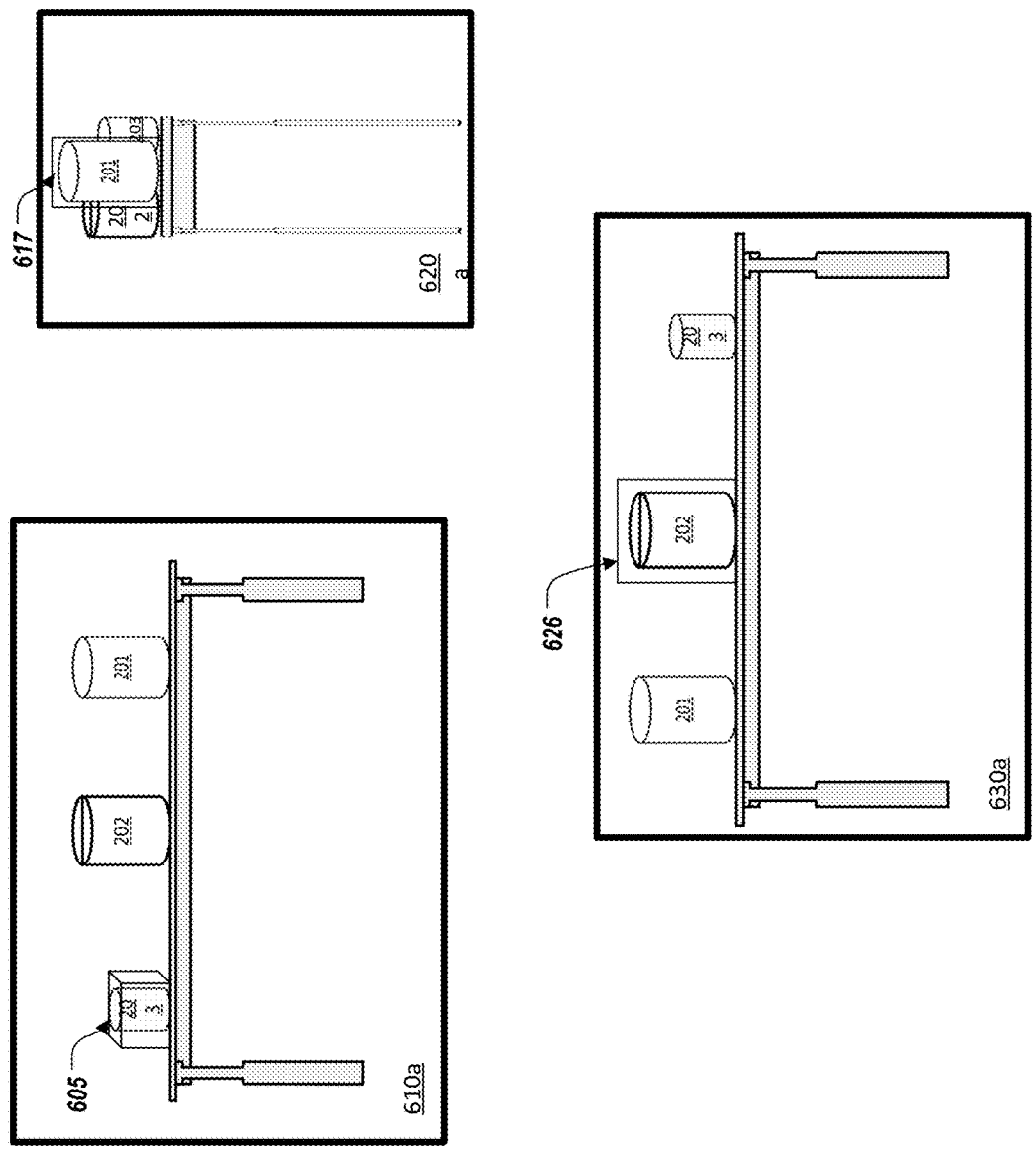
FIG. 6A illustrate the image sequence depicted in FIG. 2 with multiple objects annotated in different images of the sequence.

Although this specification describes the propagation of annotations for a single object of interest, the automated annotation system 100 can propagate annotations for multiple objects of interest together or separately. The process for multiple objects is the same as for one object. Each object can be identified separately or the automated annotation system 100 can recognize objects in proximity to one another as a group. The annotation system can then propagate the annotations of multiple objects using the 3D bounding boxes of the objects in particular images and the relative positions of the objects in other images. FIG. 6A illustrate the image sequence 110 depicted in FIG. 2 with multiple objects annotated in different images of the sequence. In operation, the automated annotation system 100 may determine the 3D pose and 3D bounding region for each object 201-203 in the same image or in different images of the sequence 110. For example, as illustrated in FIG. 6A, the 3D bounding region 605 and the pose for object 203 are defined in image 610a. The bounding region 617 and the pose for object 201 are defined in image 620a and the bounding region 626 and the pose for object 202 are defined in image 630a. In order to provide complete annotated data to a neural network, the automated annotation system 100 propagates the annotations in each of these three images to the other images in the sequence using the annotation process described above.

Figure 6B:
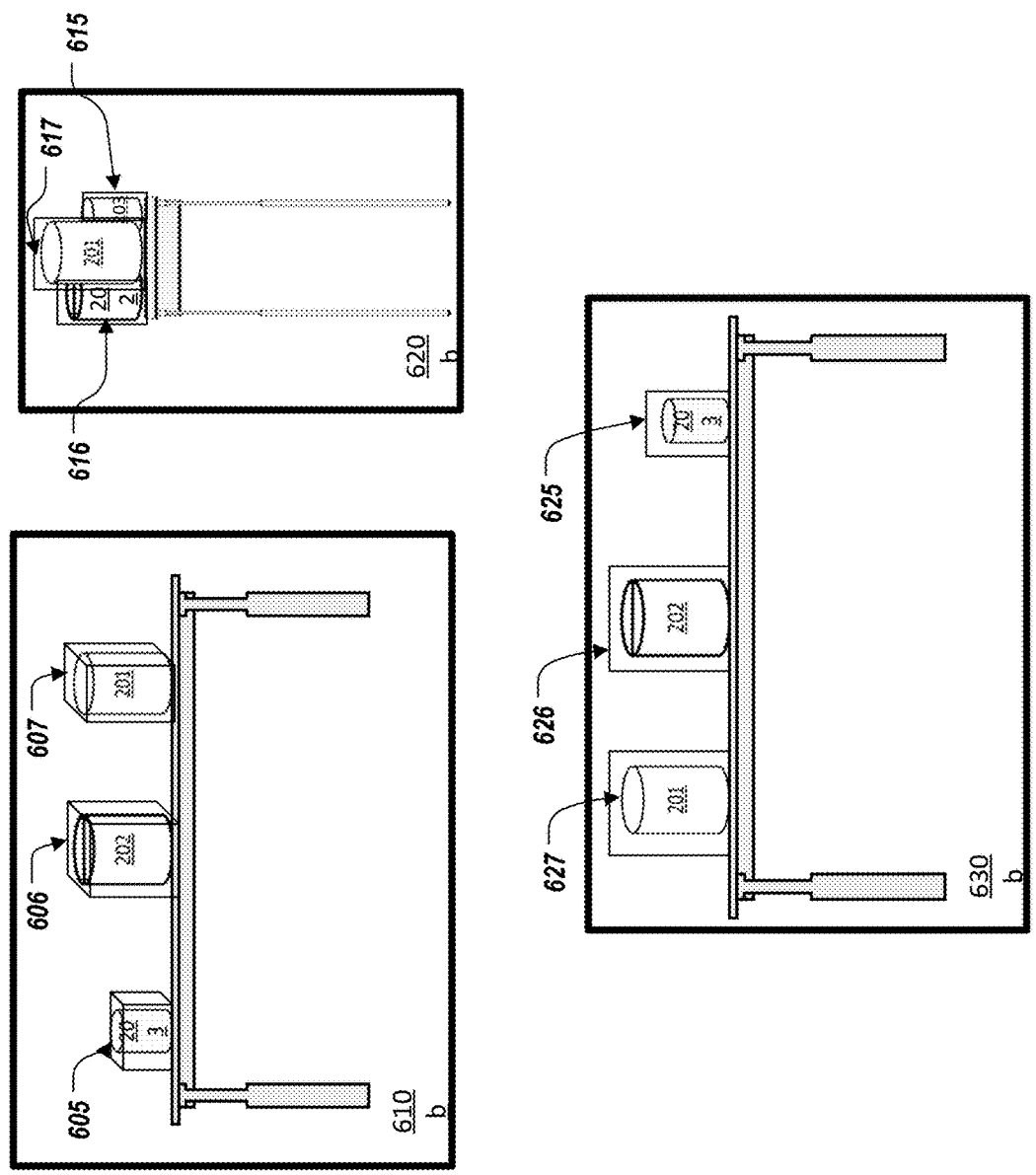
FIG. 6B illustrates the images sequence depicted in FIG. 6A with all objects annotated in every image of the sequence.

FIG. 6B illustrates the images sequence depicted in FIG. 6A with all objects annotated in every image of the sequence. The automated annotation system 100 uses the annotation process described above to identify and annotate objects in at least one image. Then the annotations can be propagated to all other images in the sequences. After propagating the annotations, the automated annotation system 100 has three fully annotated images, images 610b, 620b, and 630b as illustrated in FIG. 6B. As shown, the annotation of object 203 has been propagated from image 610a to images 620b and 630b, the annotation of object 201 has been propagated from image 620a to images 610b and 630b, and the annotation of object 202 has been propagated from image 630a to images 610b and 620b.

By using partial pose annotation of images and 3D mapping of the environment, the automated annotation system 100 fully annotates all objects in an image frame and propagates annotations to other image frames. The system provides this annotated data to a neural network to properly train the neural network to detect and manipulate objects in image frames. These trained neural networks can operate automated machines, i.e., robots, so that the machines can recognize and interact with objects in their environment.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above the following embodiments are also innovative:

Embodiment 1 is a computer-implemented method comprising: obtaining information representing a pose of a camera relative to a scene, the pose of the camera including a position and a location of the camera relative to the scene; obtaining data representing multiple images of a scene that includes an object of interest, the multiple images being captured from different angles by the camera relative to the scene, the multiple images including a first image and a plurality of other images; identifying a 3D pose of the object of interest with respect to the pose of the camera in at least the first image; defining a 3D bounding region for the object of interest in the first image, the 3D bounding region indicating a volume that includes the object of interest; and determining a location and orientation of the object of interest in the other images based on the defined 3D bounding region of the object of interest and the pose of the camera in the other images.

Embodiment 2 is the computer-implemented method of embodiment 1, further comprising: annotating each of the other images to indicate (i) a location in the image where the object of interest appears and (ii) an orientation that the object appears in the image; and storing the annotated images.

Embodiment 3 is the computer-implemented method of embodiment 2, further comprising training a machine learning model using the annotated images.

Embodiment 4 is the computer-implemented method of embodiment 3, wherein training the machine learning model comprises training a neural network to recognize objects in image data using the annotated images.

Embodiment 5 is the computer-implemented method of any of embodiments 1-4, wherein identifying a 3D pose of the object of interest with respect to the pose of the camera in at least the first image comprises using a LINEMOD method.

Embodiment 6 is the computer-implemented method of any of embodiments 1-5, wherein identifying a 3D pose of the object of interest with respect to the pose of the camera in at least the first image comprises using an EPPF method.

Embodiment 7 is the computer-implemented method of any of embodiments 1-6, wherein identifying a 3D pose of the object of interest with respect to the pose of the camera in at least the first image comprises having a user manually annotate the image by drawing a 3D bounding box around the object in the first image.

Embodiment 8 is the computer-implemented method of any of embodiments 1-7, wherein determining the location and orientation of the object of interest in the other images includes applying a camera pose estimation algorithm to the other images.

Embodiment 9 is the computer-implemented method of embodiment 7, wherein the camera pose estimation algorithm is a structure from motion algorithm.

Embodiment 10 is the computer-implemented method of embodiment 7, wherein the camera pose estimation algorithm is a visual odometry algorithm.

Embodiment 11 is the computer-implemented method of embodiment 7, wherein the camera pose estimation algorithm is a SLAM algorithm.

Embodiment 12 is the computer-implemented method of any of embodiments 1-11, further comprising: determining, for a particular image of the multiple images, an occlusion score for the object of interest that indicates an amount of the object of interest that is occluded in the particular image; and storing data that associates the occlusion score for the object of interest with the particular image.

Embodiment 13 is the computer-implemented method of embodiment 12, further comprising: obtaining a three-dimensional representation of the scene; determining a camera position that was used to acquire the particular image; and determining, based on the camera position and the three-dimensional representation of the scene, that a second object occludes a portion of the object of interest from the perspective of the determined camera position but does not fully occlude the object of interest; wherein determining the occlusion score comprises determining the occlusion score based on an amount of the object of interest that is occluded by the second object.

Embodiment 14 is the computer implemented method of embodiment 12, further comprising training a neural network using the particular image and the occlusion score.

Embodiment 15 is a system of one or more computers and one or more storage devices storing instructions that are operable, when executed by the one or more computers to cause the one or more computers to perform the operations of any one of embodiments 1-14.

Embodiment 16 is one or more non-transitory computer readable-storage mediums comprising instructions stored thereon that are executable by a processing device and upon such execution cause the processing device to perform the operations of any one of embodiments 1-14.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   obtaining information representing a pose of a camera relative to a scene, the pose of the camera including a position and a location of the camera relative to the scene;
   obtaining data representing multiple images of a scene that includes an object of interest, the multiple images being captured from different angles by the camera relative to the scene, the multiple images including a first image and a plurality of other images;
   identifying a three-dimensional (3D) pose of the object of interest with respect to the pose of the camera in at least the first image;
   defining a 3D bounding region for the object of interest in the first image, the 3D bounding region indicating a volume that includes the object of interest; and
   determining a location and orientation of the object of interest in the other images by using the defined 3D bounding region of the object of interest and the pose of the camera for the other images to project the defined 3D bounding region onto a two-dimensional (2D) region of each of the other images.

2. The computer-implemented method of claim 1, further comprising:
   annotating each of the other images to indicate (i) a location in the image where the object of interest appears and (ii) an orientation that the object appears in the image; and
   storing the annotated images.

3. The computer-implemented method of claim 2, further comprising training a machine learning model using the annotated images.

4. The computer-implemented method of claim 3, wherein training the machine learning model comprises training a neural network to recognize objects in image data using the annotated images.

5. The computer-implemented method of claim 1, wherein identifying a 3D pose of the object of interest with respect to the pose of the camera in at least the first image comprises using a LINEMOD method.

6. The computer-implemented method of claim 1, wherein determining the location and orientation of the object of interest in the other images includes applying a camera pose estimation algorithm to the other images.

7. The computer-implemented method of claim 6, wherein the camera pose estimation algorithm is a visual odometry algorithm.

8. The computer-implemented method of claim 1, further comprising:
    determining, for a particular image of the multiple images, an occlusion score for the object of interest that indicates an amount of the object of interest that is occluded in the particular image; and
    storing data that associates the occlusion score for the object of interest with the particular image.

9. The computer-implemented method of claim 8, further comprising:
    obtaining a three-dimensional representation of the scene;
    determining a camera position that was used to acquire the particular image; and
    determining, based on the camera position and the three-dimensional representation of the scene, that a second object occludes a portion of the object of interest from the perspective of the determined camera position but does not fully occlude the object of interest;
    wherein determining the occlusion score comprises determining the occlusion score based on an amount of the object of interest that is occluded by the second object.

10. The computer implemented method of claim 8, further comprising training a neural network using the particular image and the occlusion score.

11. A system comprising:
    one or more computers; and
    one or more storage devices storing instructions that are operable, when executed by the one or more computers, to cause the one or more computers to perform operations comprising:
        obtaining information representing a pose of a camera relative to a scene, the pose of the camera including a position and a location of the camera relative to the scene;
        obtaining data representing multiple images of a scene that includes an object of interest, the multiple images being captured from different angles by the camera relative to the scene, the multiple images including a first image and a plurality of other images;
        identifying a three-dimensional (3D) pose of the object of interest with respect to the pose of the camera in at least the first image;
        defining a 3D bounding region for the object of interest in the first image, the 3D bounding region indicating a volume that includes the object of interest; and
        determining a location and orientation of the object of interest in the other images by using the defined 3D bounding region of the object of interest and the pose of the camera for the other images to project the defined 3D bounding region onto a two-dimensional (2D) region of each of the other images.

12. The system of claim 11, wherein the operations further comprise:
    annotating each of the other images to indicate (i) a location in the image where the object of interest appears and (ii) an orientation that the object appears in the image; and storing the annotated images.

13. The system of claim 12, further comprising training a machine learning model using the annotated images.

14. The system of claim 13, wherein training the machine learning model comprises training a neural network to recognize objects in image data using the annotated images.

15. One or more non-transitory computer-readable storage mediums comprising instructions stored thereon that are executable by a processing device and upon such execution cause the processing device to perform operations comprising:
    obtaining information representing a pose of a camera relative to a scene, the pose of the camera including a position and a location of the camera relative to the scene;
    obtaining data representing multiple images of a scene that includes an object of interest, the multiple images being captured from different angles by the camera relative to the scene, the multiple images including a first image and a plurality of other images;
    identifying a three-dimensional (3D) pose of the object of interest with respect to the pose of the camera in at least the first image;
    defining a 3D bounding region for the object of interest in the first image, the 3D bounding region indicating a volume that includes the object of interest; and
    determining a location and orientation of the object of interest in the other images by using the defined 3D bounding region of the object of interest and the pose of the camera for the other images to project the defined 3D bounding region onto a two-dimensional (2D) region of each of the other images.

16. The computer-implemented method of claim 1, further comprising:
    determining, for a particular image of the multiple images, an occlusion score for the object of interest that indicates an amount of the object of interest that is occluded in the particular image; and
    training a neural network including providing the occlusion score for the object of interest to the neural network during training.

17. The computer-implemented method of claim 16, wherein the particular image has multiple objects of interest at least partially visible in the particular image;
    wherein the method comprises determining an occlusion score for each of the objects of interest; and
    wherein training the neural network comprises providing the neural network with the occlusion score for each object of interest during training.

18. The computer-implemented method of claim 1, further comprising, for each particular image of the other images, annotating the particular image to indicate a region representing a 2D projection of the 3D bounding region onto the particular image, wherein the 2D projection is determined according to the pose of the camera when the particular image was captured.

* * * * *